(12) United States Patent
Tagg

(10) Patent No.: US 6,594,661 B1
(45) Date of Patent: Jul. 15, 2003

(54) METHOD AND SYSTEM FOR CONTROLLING ACCESS TO A SOURCE APPLICATION

(75) Inventor: Bradley S. Tagg, Chester, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/473,242

(22) Filed: Dec. 27, 1999

(51) Int. Cl.[7] .............................................. G06F 17/30
(52) U.S. Cl. .............................................. 707/9; 707/10
(58) Field of Search ........................ 707/9, 10; 709/213

(56) References Cited

U.S. PATENT DOCUMENTS

| | | | |
|---|---|---|---|
| 5,694,601 A | 12/1997 | White | 395/671 |
| 5,960,441 A | 9/1999 | Bland et al. | 707/104 |
| 5,987,506 A * | 11/1999 | Carter et al. | 709/213 |
| 6,014,666 A * | 1/2000 | Helland et al. | 707/9 |
| 6,144,959 A * | 11/2000 | Anderson et al. | 707/9 |
| 6,154,741 A * | 11/2000 | Feldman | 707/9 |
| 6,202,066 B1 * | 3/2001 | Barkley et al. | 707/9 |
| 6,314,425 B1 * | 11/2001 | Serbinis et al. | 707/10 |
| 6,408,336 B1 * | 6/2002 | Schneider et al. | 709/229 |

* cited by examiner

*Primary Examiner*—Safet Metjahic
*Assistant Examiner*—Cam Linh Nguyen
(74) *Attorney, Agent, or Firm*—Scully, Scott, Murphy & Presser; Arthur J. Samodovitz, Esq.

(57) ABSTRACT

A method and system for controlling access to a source application. The method comprises the steps of providing a controlling application, and binding the source application to the controlling application to allow the controlling application to change access to the source application. Information is passed from the source application to the controlling application to identify the source application and reference data to define access to the source application, and group and role definitions are constructed within the controlling application. An access definition is created by assigning a user access to the source application based on the group and role definitions and the reference data, and that access definition is exported to the source application.

15 Claims, 3 Drawing Sheets

FIG. 3
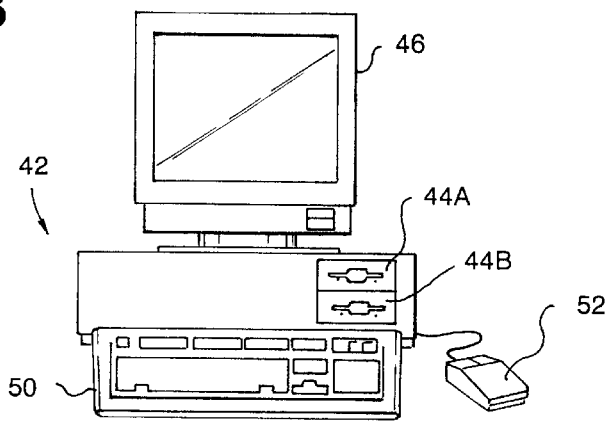
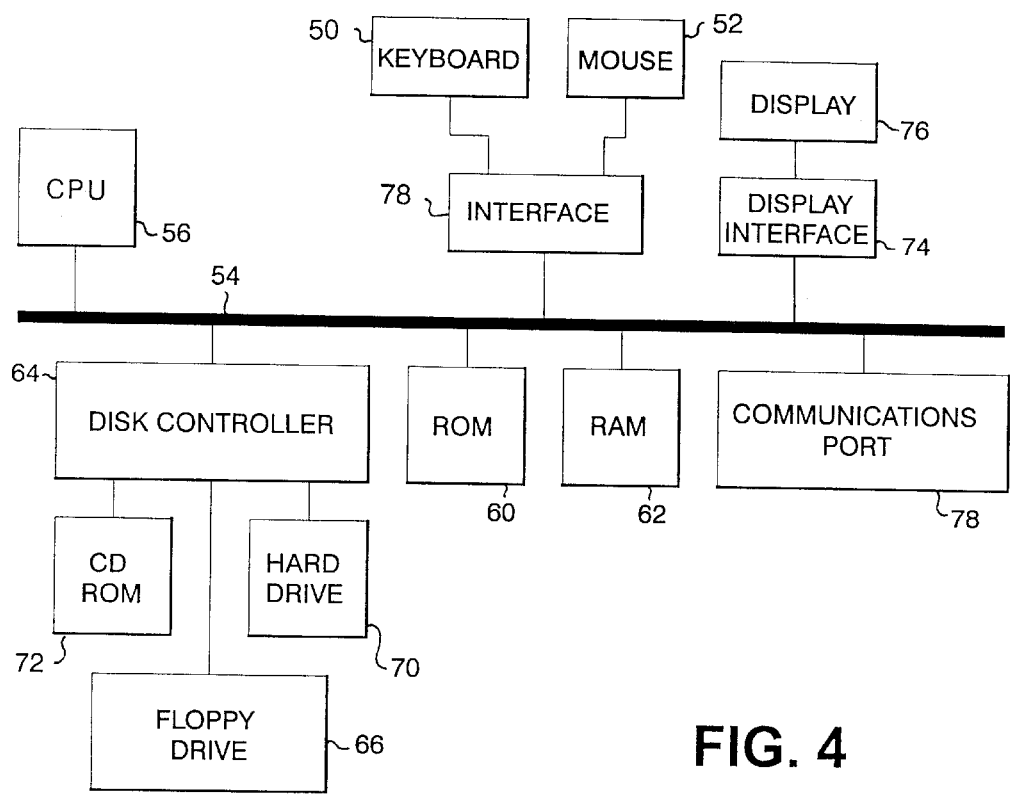
FIG. 4

METHOD AND SYSTEM FOR CONTROLLING ACCESS TO A SOURCE APPLICATION

BACKGROUND OF THE INVENTION

This invention generally relates to managing user access to computer applications; and more specifically, to methods and systems for creating access definitions.

In many situations, computer applications are often designed for limited or restricted access. Present procedures for managing access to applications are not completely satisfactory for a number of reasons. For instance, when developing applications, developers must build functions within each application that manage access to the applications. Many times this entails duplicating the same functions regarding identifying users and groups of users, and mapping these to what access they can perform.

Also, when administrators want to provide user access to a group of applications, those administrators must work with each application individually to define that access. In addition, with typical applications, access constructs such as groups and roles cannot be shared across applications, and these constructs must be defined within each application in the proprietary manner that the application supports.

SUMMARY OF THE INVENTION

An object of this invention is to improve methods and systems for managing access to computer applications.

Another object of the present invention is to manage access to several applications using one controlling application that receives, through a defined protocol, the data elements needed to provide that access.

A further object of this invention is to create single definitions for access constructs such as groups and roles that can be used across many applications.

A still another object of the present invention is to manage access control from one controlling application, with that controlling application sharing these access definitions back to the application being controlled via a defined protocol and format.

These and other objectives are attained with a method and system for controlling access to a source application. The method comprises the steps of providing a controlling application, and binding the source application to the controlling application to allow the controlling application to change access to the source application. Information is passed from the source application to the controlling application to identify the source application and reference data to define access to the source application, and group and role definitions are constructed within the controlling application. An access definition is created by assigning a user access to the source application based on the group and role definitions and the reference data, and that access definition is exported to the source application.

The preferred embodiment of this invention provides a single controlling application and set of protocols whose functions, among others, allow for the binding of a source application with the controlling application so as to form a handshake or agreement that the controlling application has the ability to change access to the source application. Also, with this preferred embodiment, the source application provides what reference data it wants to the controlling application to use in defining access definitions. This reference data are passed via a defined protocol that allows the source application to define and enumerate reference data that it wants to use in controlling access.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 3 and 4 illustrate a computer system that may be used in the practice of this invention.

DETAILED DESCRIPTION OF THE PREFERRED EMBODIMENTS

Figure 1:
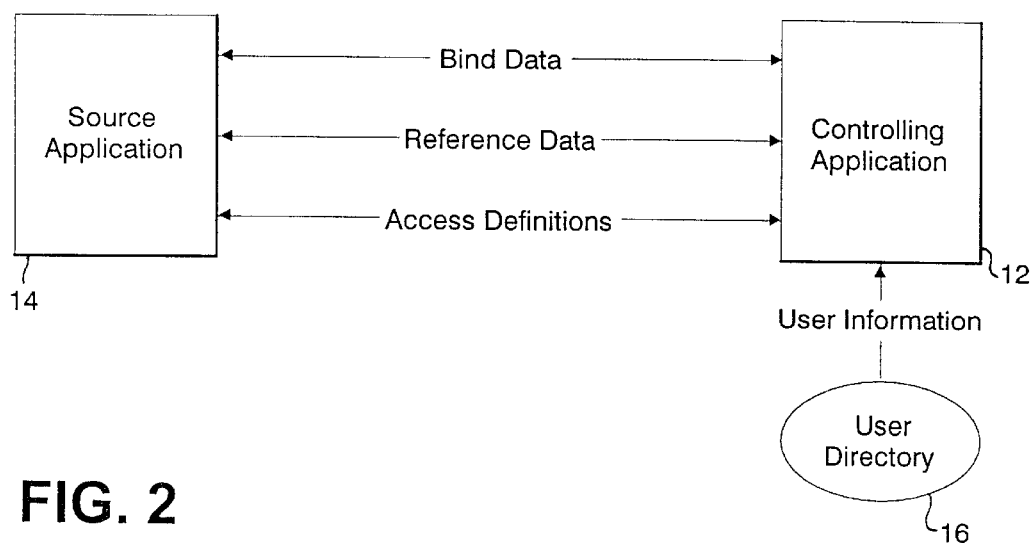
FIG. 1 diagrammatically illustrates the operation of this invention.
Figure 2:
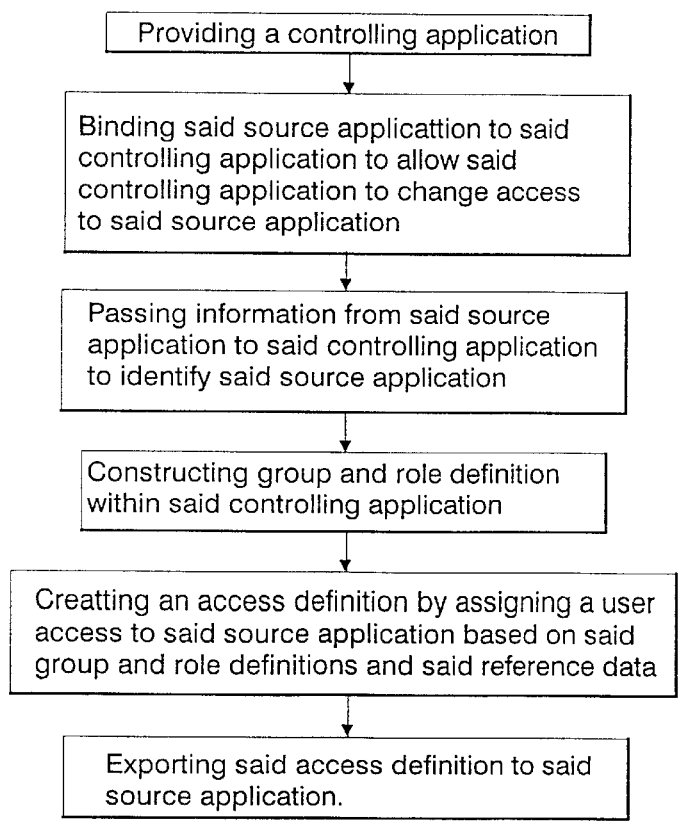
FIG. 2 is a flow chart outlining a preferred method embodying the present invention.

The present invention is a method and system for controlling access to a source application. With reference to FIGS. 1 and 2, the method of this invention comprises the steps 20 and 22 of providing a controlling application 12, and binding the source application 14 to the controlling application to allow the controlling application to change access to the source application.

The method comprises the further steps 24 and 26 of passing information from the source application 14 to the controlling application 12 to identify the source application and reference data to define access to the source application, and constructing group and role definitions within the controlling application. Access definitions are created at step 28 by assigning a user access to the source application based on the group and role definitions and the reference data, and the access definition is exported at step 30 to the source application.

The preferred embodiment of this invention provides a single controlling application 12 and set of protocols whose functions, among others, allow for the binding of a source application 14 with the controlling application so as to form a handshake or agreement that the controlling application has the ability to change access to the source application. This is implemented via a defined protocol that binds the applications together for the purposes of access control. Information is passed between the source application and the controlling application that uniquely identifies the source application.

Also, with this preferred embodiment, the source application 14 provides what reference data it wants the controlling application 12 to use in defining access definitions. This reference data are passed via a defined protocol that allows the source application to define and enumerate reference data that it wants to use in controlling access. The reference data flow is dynamic and can be changed as needed. In addition, the controlling application has the ability to employ a user directory 16 containing user ID's for the purposes of determining which user is to be given a particular access, and the controlling application has the ability to construct group and role definitions that can be used across applications. The group and role definitions are managed and encapsulated separately from the definitions pertaining to applications and reference data.

As will be understood by those of ordinary skill in the art, any suitable application platform may be used to provide the above-discussed functions, and, for example, Lotus Notes may be used as the application platform.

Among other advantages, the present invention provides a means for application administrators to create access definitions for many applications using one controlling application, thus minimzing training and development costs. Also, group and role definitions that can be used by more than one application can be created, thus minimizing the number of administrative constructs required. In addition, application administrators are able to encapsulate the management of access to an application from the application itself.

FIG. 3 illustrates a computer of a type suitable for carrying out the invention. Viewed externally in FIG. 3, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

FIG. 4 shows a block diagram of the internal hardware of the computer of FIG. 3. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 5:
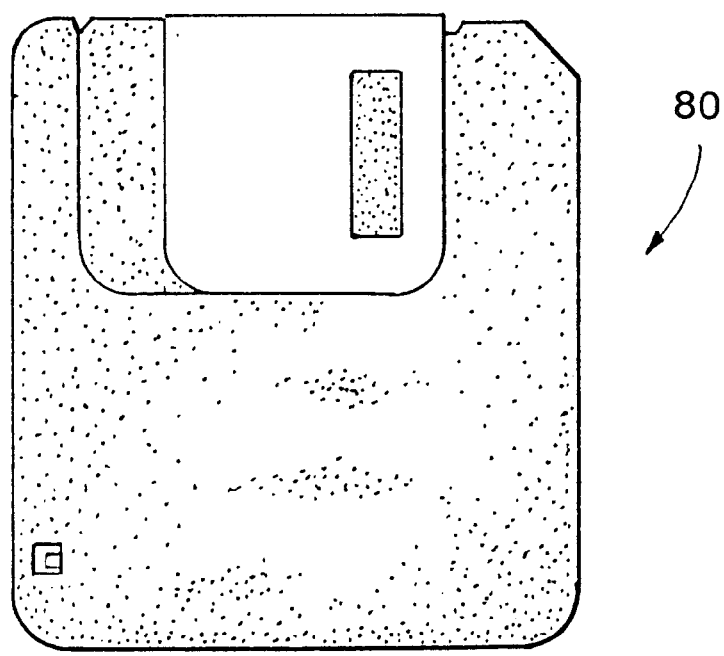
FIG. 5 shows a memory medium that may be used to hold a computer program for implementing the present invention.

FIG. 5 illustrates an exemplary memory medium 80 that can be used with drives such as 66 in FIG. 4 or 44A in FIG. 3. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of controlling access to a source application, comprising the steps of:
   providing a controlling application;
   binding said source application to said controlling application to allow said controlling application to change access to said source application;
   passing information from said source application to said controlling application to identify said source application and reference data for use by the controlling applications to create definitions for access to said source application;
   constructing group and role definitions within said controlling application;
   said controlling application using said group and role definition and said reference data to create an access definition within the controlling application for the source application, and assigning a user access to said source application based on said access definition; and
   exporting said access definition to said source application, and using said access definition to control access to the source application.

2. A method according to claim 1, wherein the passing step includes the step of passing information from the source application to the controlling application that uniquely identifies the source application and enables the controlling application to create the access definition for the source application.

3. A method according to claim 1, wherein the passing step includes the step of passing the reference data from the source application to the controlling application via a defined protocol that allows the source application to define and enumerate reference data for controlling access to the source application.

4. A method according to claim 1, wherein the creating step includes the step of, the controlling application, employing a user directory containing user identifications for the purposes of determining which user is to be given a particular access.

5. A method according to claim 1, wherein the step of exporting the access definition includes the step of, the source application using the access definition to control access to the source application independent of the controlling application.

6. A system for controlling access to a source application, comprising: a controlling application;
   means for binding said source application to said controlling application to allow said controlling application to change access to said source application;
   means for passing information from said source application to said controlling application to identify said source application and reference data for use by the controlling application to create definitions for access to said source application;
   means for constructing group and role definitions within said controlling application;
   means for using said group and role definitions and said reference data to create an access definition within the controlling application, and for assigning a user access to said source application based on said access definition; and
   means for exporting said access definition to said source application, and using said access definition to control access to the source application.

7. A system according to claim 6, wherein the passing means includes means for passing information from the source application to the controlling application that uniquely identifies the source application and enables the controlling application to create the access definition for the source application.

8. A system according to claim 6, wherein the passing means includes the means for passing the reference data from the source application to the controlling application via a defined protocol that allows the source application to define and enumerate reference data for controlling access to the source application.

9. A system according to claim 6, wherein the controlling application includes means for employing a user directory containing user identifications for the purposes of determining which user is to be given a particular access.

10. A system according to claim 6, wherein the controlling application includes means for receiving the exported access definition and for using said access definition to control access to the source application independent of the controlling application.

11. A program storage device readable by machine, tangibly embodying a program of instructions executable by the machine to perform method steps for controlling access to a source application, said method steps comprising:

providing a controlling application;

binding said source application to said controlling application to allow said controlling application to change access to said source application;

passing information from said source application to said controlling application to identify said source application and reference data for definitions for access to said source application;

constructing group and role definitions within said controlling application;

using said group and role definitions and said reference data to create an access definition within the controlling application, and assigning a user access to said source application based on said access definition; and exporting said access definition to said source application, and using said access definition to control access to the source application.

12. A program storage device according to claim 11, wherein the passing step includes the step of passing information from the source application to the controlling application that uniquely identifies the source application and enables the controlling application to create the access definition for the source application.

13. A program storage device according to claim 11, wherein the passing step includes the step of passing the reference data from the source application to the controlling application via a defined protocol that allows the source application to define and enumerate reference data for controlling access to the source application.

14. A program storage device according to claim 11, wherein the creating step includes the step of, the controlling application, employing a user directory containing user identifications for the purposes of determining which user is to be given a particular access.

15. A program storage device according to claim 11, wherein the step of exporting the access definition includes the step of, the source application using the exported access definition to control access to the source application independent of the controlling application.

* * * * *